US011501514B2

United States Patent
Wu et al.

(10) Patent No.: US 11,501,514 B2
(45) Date of Patent: *Nov. 15, 2022

(54) UNIVERSAL OBJECT RECOGNITION

(71) Applicant: A9.com, Inc., Palo Alto, CA (US)

(72) Inventors: Hao-Yu Wu, Palo Alto, CA (US); Tian Cao, Santa Clara, CA (US); Bhargava Urala Kota, Buffalo, NY (US); Mehmet Nejat Tek, Palo Alto, CA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/067,381

(22) Filed: Oct. 9, 2020

(65) Prior Publication Data

US 2021/0027085 A1 Jan. 28, 2021

Related U.S. Application Data

(63) Continuation of application No. 16/123,130, filed on Sep. 6, 2018, now Pat. No. 10,846,552.

(51) Int. Cl.
*G06V 10/20* (2022.01)
*G06F 16/583* (2019.01)
*G06N 5/04* (2006.01)

(52) U.S. Cl.
CPC .......... *G06V 10/255* (2022.01); *G06F 16/583* (2019.01); *G06N 5/046* (2013.01); *G06V 2201/09* (2022.01)

(58) Field of Classification Search
CPC .......................... G06K 2209/25; G06K 9/3241
See application file for complete search history.

(56) References Cited

U.S. PATENT DOCUMENTS

2015/0010228 A1* 1/2015 Rogers ............... G06K 9/00536
382/141
2015/0178777 A1* 6/2015 Jing ....................... G06Q 30/02
705/14.57

(Continued)

OTHER PUBLICATIONS

Non-Final Rejection issued in U.S. Appl. No. 16/123,130, dated Apr. 16, 2020.

(Continued)

*Primary Examiner* — Bobbak Safaipour
(74) *Attorney, Agent, or Firm* — Hogan Lovells US LLP

(57) ABSTRACT

Large scale instance recognition is provided that can take advantage of channel-wise pooling. A received query image is processed to extract a set of features that can be used to generate a set of region proposals. The proposed regions of image data are processed using a trained classifier to classify the regions as object or non-object regions. Extracted features for the object regions are processed using feature correlation against extracted features for a set of object images, each representing a classified object. Matching tensors generated from the comparison are processed using a spatial verification network to determine match scores for the various object images with respect to a specific object region. The match scores are used to determine which objects, or types of objects, are represented in the query image. Information or content associated with the matching objects can be provided as part of a response.

20 Claims, 7 Drawing Sheets

(56) References Cited

U.S. PATENT DOCUMENTS

| | | | |
|---|---|---|---|
| 2016/0048536 A1* | 2/2016 | Di | G06V 10/751 |
| | | | 382/165 |
| 2017/0076174 A1* | 3/2017 | Song | G06V 20/64 |
| 2018/0011611 A1* | 1/2018 | Pagaime da Silva | ............. |
| | | | G06F 3/0482 |
| 2018/0018522 A1* | 1/2018 | Litvak | G06V 20/40 |
| 2018/0197042 A1* | 7/2018 | Porter | G06V 20/46 |
| 2018/0260414 A1* | 9/2018 | Gordo Soldevila | G06N 3/084 |
| 2018/0260415 A1* | 9/2018 | Gordo Soldevila | G06V 10/454 |
| 2018/0341907 A1* | 11/2018 | Tucker | G06Q 10/087 |
| 2020/0090007 A1* | 3/2020 | Joseph | G06K 9/6223 |
| 2021/0326630 A1* | 10/2021 | Chen | G06V 10/40 |
| 2021/0326678 A1* | 10/2021 | Smolyanskiy | G06T 1/20 |

OTHER PUBLICATIONS

Notice of Allowance issued in U.S. Appl. No. 16/123,130, dated Jul. 23, 2020.

* cited by examiner

UNIVERSAL OBJECT RECOGNITION

CROSS-REFERENCE TO RELATED APPLICATIONS

This application is a continuation of allowed U.S. application Ser. No. 16/123,130, filed Sep. 6, 2018, entitled "UNIVERSAL OBJECT RECOGNITION", the full disclosure of which is incorporated herein by reference for all purposes.

BACKGROUND

As computing technology continues to advance and an increasing amount of data is stored electronically, there is a corresponding increase in the demand to be able to locate data in ways that were not previously possible. For example, a user might submit an image that includes a representation of an object for which the user would like to obtain information. Various types of objects can be identified using computer vision techniques, but conventional techniques are limited by the data available for comparison or verification. While machine learning approaches can be used, these are still limited in large part by the training set used, as well as the set of data available for verification.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for the determination of content to provide in response to the recognition of one or more types of objects in provided query data. In particular, various approaches provide for large scale instance recognition from image data, such as by utilizing channel-wise max pooling. In various embodiments, a query image may be received that includes a representation of an object of interest. The query image can be processed to extract a set of features that can be used to generate a set of region proposals, where each region corresponds to a potential object representation. The regions are processed using a trained classifier to classify the region proposals as object or non-object regions. Extracted features for the object regions can then be processed using feature correlation against extracted features for a set of object images, each representing a classified object. Matching tensors generated from the comparison can be processed using a spatial verification network to determine match scores for the various object images with respect to a specific object region. The match scores can then be used to determine which objects, or types of objects, are represented in the query image, as may relate to logos, apparel items, geographic features, and the like. Information or content associated with the matching objects can then be provided as part of a response to the query image.

Various other functions can be implemented within the various embodiments as well as discussed and suggested elsewhere herein.

Figure 1A:
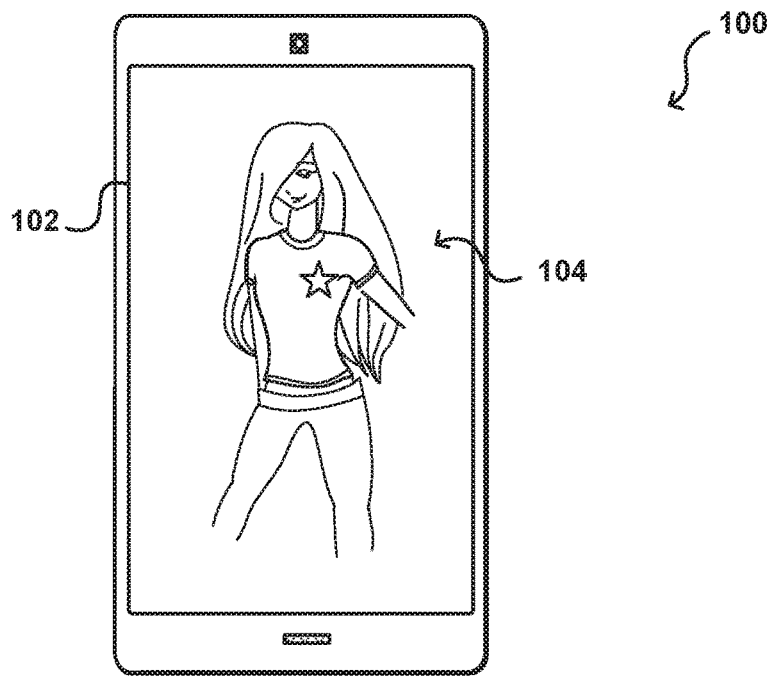
FIGS. 1A, 1B, 1C, 1D, and 1E illustrate example approaches to analyzing image data that can be utilized in accordance with various embodiments.

As mentioned, there can be various ways to locate content in a computer-based system. One such way involves computer vision, where image data (e.g., still images or frames of video data) i submitted or received that include a representation of one or more objects of interest. As an example, FIG. 1A illustrates an example situation 100 wherein a user has obtained an image of an object of interest 104. The image can have been obtained in any of a number of different ways, such as by capturing the image using a camera of the device or obtaining the image from a network such as the Internet, among other such options. In this example, the image is displayed on a display screen 102 of a device used to capture the image. Here, the object of interest can include a shirt worn by a person in a field of view of a camera of the device. If the user is interested in obtaining information about the object, the user can select an interface option to cause that image to be processed using a search and/or recognition system or service.

When analyzing the image, a recognition service in some embodiments will first need to identify one or more potential objects represented in the image, and then attempt to identify or recognize the type of object represented. There may be various objects in an image, and a given object may correspond to one or more object types. For example, the woman represented in the image data in FIG. 1A is wearing multiple objects of clothing. The woman herself could also be considered a potential object of interest for computer vision purposes. The shirt that the woman is wearing represents a potential object of interest, as well as the logo that is on the shirt worn by the woman. There are various other potential objects of interest illustrated (e.g., hair, pants, etc.) that might be considered as well.

Figure 1B:
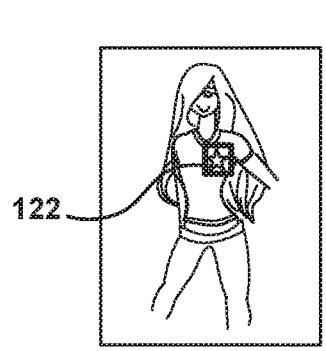
Figure 1C:
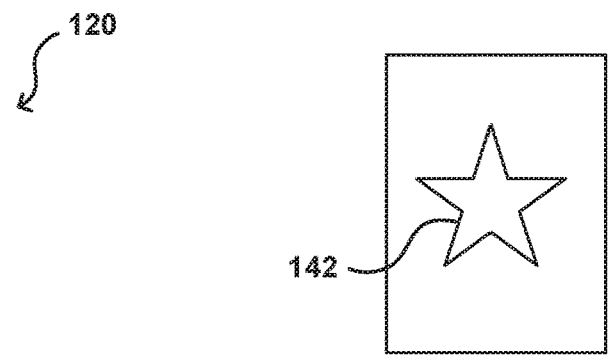

In various embodiments, an initial step can be to process the image data using an object recognition process. The object recognition process can be configured to identify regions in the image data that may correspond to an object of a type that the process is configured to recognize. For example, the object recognition process might be trained to recognize patterns in image data that may correspond to a logo, such as a graphical representation that is representative of a company, person, or entity, as known for such purposes. As illustrated in the example image 120 FIG. 1B, the process can identify a region that demonstrates such a pattern of features. In this example a bounding box 122 is illustrated that indicates the location and size of the region determined to represent a potential logo. The image data in this region can then be compared against a clean logo image 140, such as is illustrated in FIG. 1C, that includes a known representation of a specific logo. In at least some embodiments the region of interest can be compared against logo images from a set of annotated images in order to find a match, such as where the logo in the captured image is determined to correspond to the logo in the annotated image with at least a minimum confidence or certainty. As discussed elsewhere herein, the comparison can be performed using feature vectors or other extracted data, rather than a full image match in at least some embodiments.

Figure 1D:
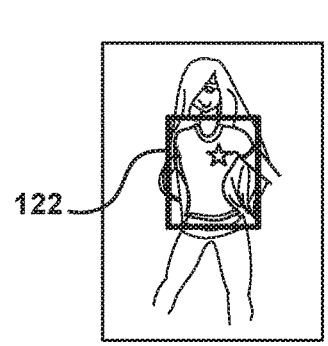
Figure 1E:
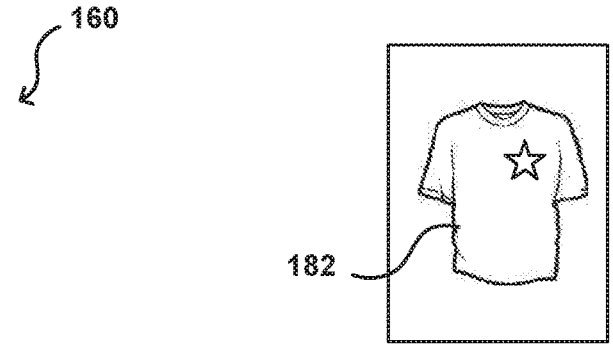

As illustrated in the example image 140 FIG. 1D, the process can identify a region that demonstrates such a pattern of features. In this example a different bounding box 162 is illustrated that indicates the location and size of a region determined to represent a potential object of interest, here a shirt. The image data in this region can then be compared against a clean item image 180, such as is illustrated in FIG. 1E, that includes a known representation of a specific shirt. For such an example, the set of images used for the analysis can correspond to a certain category or sub-category of object, such as apparel, shirts, women's shirts, and so on. In some instances the appropriate categorization may be determined from the request, but in other instances an attempt might be made to automatically determine the category. Where appropriate categorization cannot be determined with sufficient confidence, the image match can be performed across all potential object categories or classes in at least some embodiments. As with logos, in at least some embodiments the region of interest can be compared against object images from a set of annotated images in order to find a match. In at least some embodiments, locating a match can cause at least an identifier to be returned from the visual search analysis process, such as an identifier for a specific item or logo identified from the input image data. In some embodiments, region proposals could be generated for both the logo and the shirt regions, and both regions could be processed to generate a match score. Results may then include results for both the identified shirt and the identified logo, unless the search was somehow restricted to only one of those object types, or only one type of result makes sense for the context, etc.

Figure 2A:
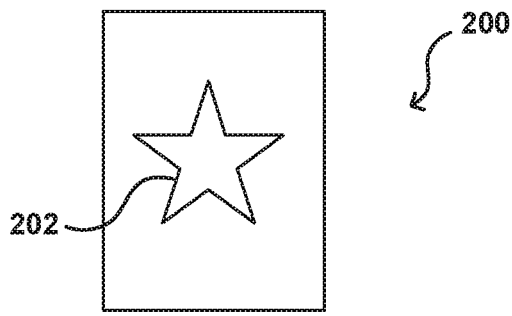
FIGS. 2A, 2B, 2C, and 2D illustrate example displays that can be provided in response to different types of recognized objects in accordance with various embodiments.
Figure 2B:
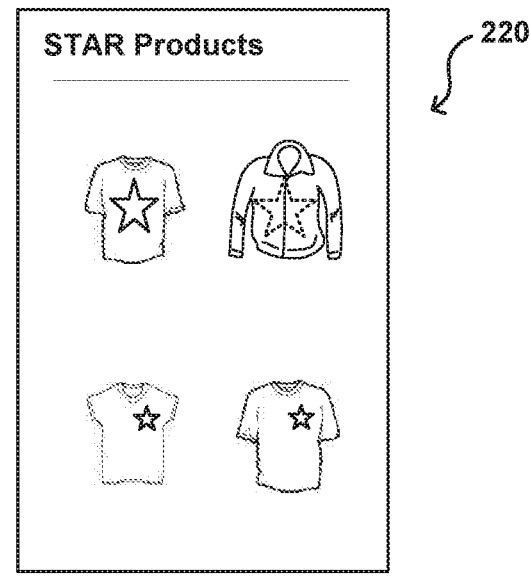

An object identifier can be used to locate content to provide in response to the request. The type of object associated with the identifier can, in some embodiments, be used to determine the type of content to provide, at least where the type of content it not specified by, or associated with, the search request. For example, in FIG. 2A it is illustrated that the matching image 200 includes a particular logo 202, and an identifier associated with that logo is determined. Since the type of object identified is a logo, the content provided can include information for a set of items having, or associated with, that logo, as illustrated in the display 220 of FIG. 2B. Here, the content provided can relate to items that include the logo and are available for purchase. It should also be understood that the logo might correspond to a type of item such as an automobile, for example, where the content might include images or text about those automobiles but the automobiles themselves may not be for sale, or at least not for sale through the provided content. The logo might also correspond to a sports team, which might cause articles to be provided that are related to that sports team. Various other types of content can be provided as well within the scope of the various embodiments, there the content relates in some way to the logo or an entity associated with the logo, etc.

Figure 2C:
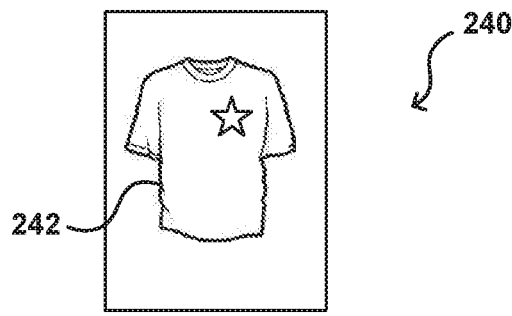
Figure 2D:

FIG. 2C illustrates another example, wherein the matching image 240 includes a type of object 242, and an identifier associated with that object is determined. Since the type of object identified is a specific item, here a shirt, the content provided can include information for the identified shirt, as illustrated in the display 260 of FIG. 2D. Here, the content provided can provide information about the shirt, such as the brand, price, availability, and the like. As mentioned, such information can be provided for any type of identified object, and need not relate to objects offered for consumption. If the identified object is a building then the information might include address and visiting hours. If the object is a parcel of land then the information might include address information and street or satellite views of the parcel. Various other types of information can be provided as well as are known for various types of items.

Figure 3:
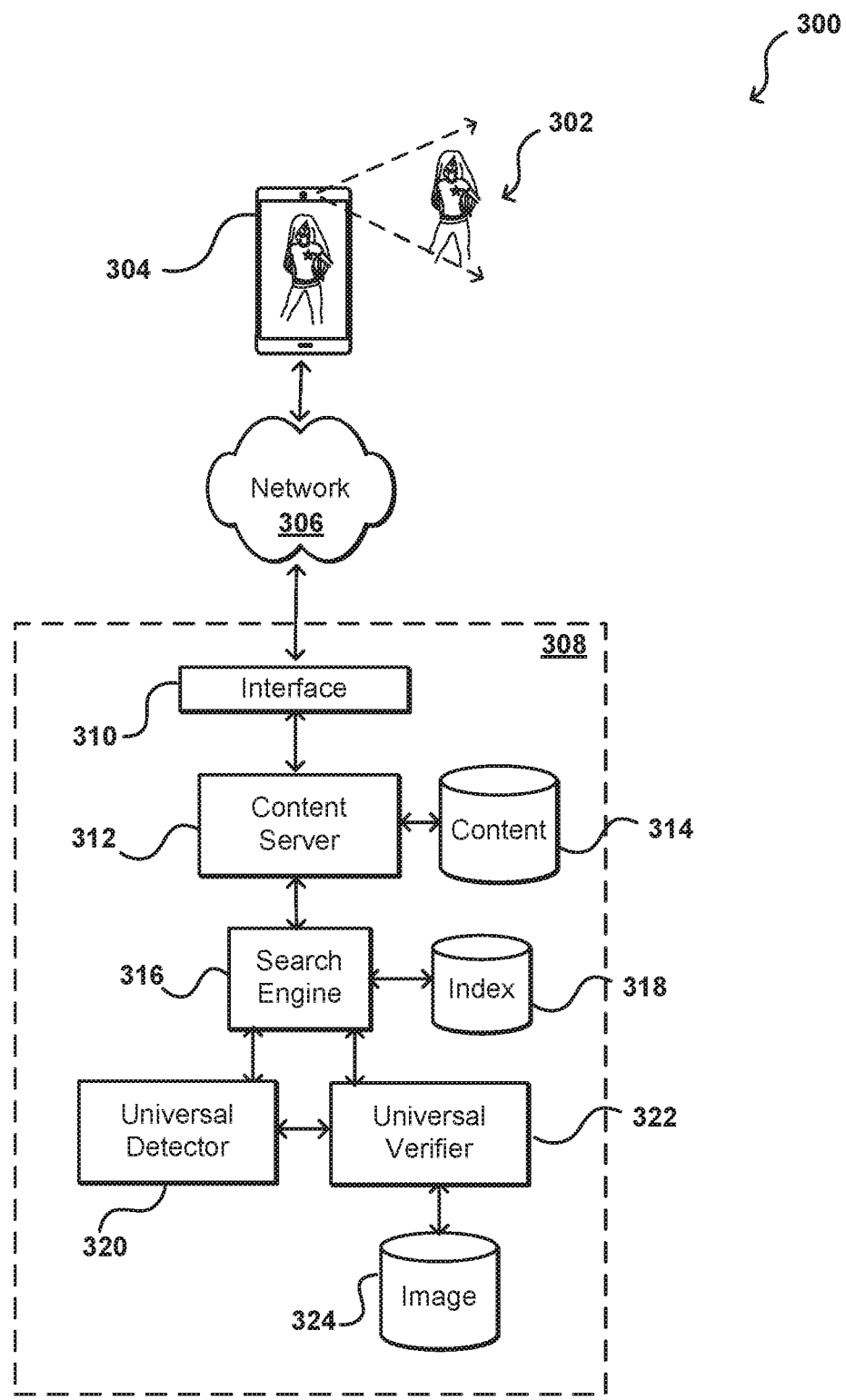
FIG. 3 illustrates an example system for analyzing input image data that can be utilized in accordance with various embodiments.

FIG. 3 illustrates an example system 300 that can be utilized to perform such processing in accordance with various embodiments. In this example a user is able to utilize a client device 304 to obtain image data for an object of interest 302, such as a logo, product, or item. The client device can include any appropriate electronic device operable to send and receive requests, messages, or other such information over an appropriate network and convey information back to a user of the device. Examples of such client devices include personal computers, tablet computers, smart phones, notebook computers, and the like. In the illustrated example the user is able to use a camera of a portable computing device, such as a smart phone or tablet, to capture an image of the object, but other approaches for obtaining the image data can be used as well as discussed elsewhere herein. The image data can be attached to, or otherwise associated with, a search request or similar transmission sent across at least one network 306, such as the Internet and/or a cellular network, among other such options. The request can be received to a resource provider environment 308, for example, which can include resources for processing the request. The resource provider can be associated with the content being searched or might offer or host search services for third party content, among other such options. The resource provider environment 308 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In this example, the request can be received to an interface layer 310 configured to direct incoming requests. As discussed in more detail elsewhere herein, the interface layer can include application programming interfaces (APIs) or other exposed interfaces enabling requests to be received by the provider environment. The interface layer 310 can include other components as well, such as at least one Web server, routing components, load balancers, and the like. When a request to perform a search using submitted image data is received, for example, the request (or information from the request) can be forwarded by the interface layer 310 to a content server 312 or other such sub-system or service for processing the request. The content server 312 can analyze the request, and can cause the relevant information, including the image data, to be transmitted to a search engine 316 or other such search service. The search engine 316 can transmit the image data to a universal detector 320 that is configured to identify one or more regions in the image data that correspond to a type of object which the universal detector is configured to recognize. As mentioned, in some embodiments the detector may be able to detect any type of object, but may be configured to report information for only specific types, or objects with specific characteristics, among other such options. The detector can use any of a number of different types of object detection algorithms, as may relate to use of a convolutional neural network, including algorithms such as Faster R-CNN, SSD and YOLO, among others as discussed elsewhere herein.

In this example, the universal detector 320 will determine the boundary or coordinates for a region including a likely object of interest, such as a region having features that match a logo pattern, and information for the boundary can be passed to the search engine 316 or directly to a universal verifier. In some embodiments the boundary is a bounding box, and pixel locations for the bounding box in the image are passed to the universal verifier, although in other embodiments only the image data corresponding to the bound region is passed to the universal verifier, among other such options. The universal verifier 324 can compare the image data from the bound region against image data stored to an image data repository 324. Although shown as a separate repository, it should be understood that in some embodiments the universal verifier could utilize image data stored in the content repository 314 as well, or instead. Further, as mentioned elsewhere herein the image data stored for analysis can include complete image files, partial image files, a subset of image data, or sets of image features extracted from the various images, among other such options. A comparison can be performed as discussed herein to attempt to identify or recognize the object in the identified region of the input query image. If a match is located with sufficient confidence or probability, for example, identifying information for the object can be passed back to the search engine 316. The search engine can use a search index 318 as part of the search process as well, as known for such purposes. The search engine 316 in this example can then pass information for the determined object to the content server, which can pull the appropriate content from the content repository 314, or another such location, and cause that content to be available to the client device 304. Although a single content repository associated with the resource provider environment 308 is illustrated, it should be understood that there may be other repositories utilized that may be associated with other entities as well within the scope of the various embodiments. Various types of content can be provided to the client device as discussed herein, as may include a page of search results, content describing an identified object, and the like.

Figure 4:
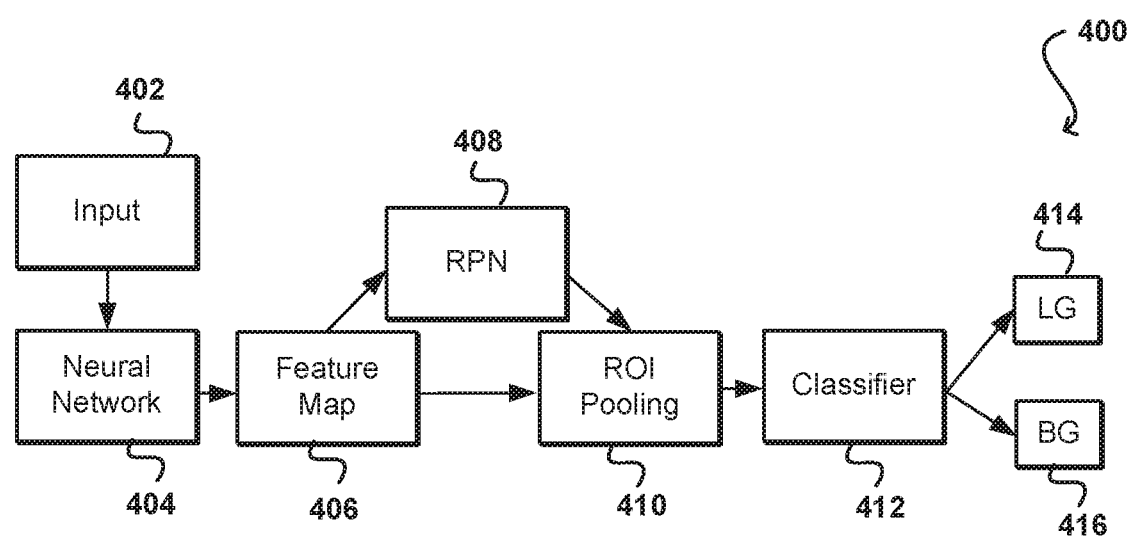
FIG. 4 illustrates an example pipeline useful for determining a presence of one or more types of objects represented in image data that can be utilized in accordance with various embodiments.

FIG. 4 illustrates components of an example pipeline 400 that can be used for the universal detector 320 of FIG. 3 in at least some embodiments. In this example, the image data including the representation of the object of interest is provided as input 402. In this example the input is provided to a trained neural network 404, although any appropriate machine learning algorithm or process, or similar approach, can be utilized as well within the scope of the various embodiments. As mentioned, the network can be trained on various types of objects, such as logos, items, products, buildings, geographic locations, and the like. An example logo detector is trained using the Faster-RCNN model based on a ZFNet convolutional neural network with two output classes: logo and background. Therefore, the model functions as a universal logo detector as it classifies each pixel as either logo or background (or non-logo). An example ZFNet has five convolutional layers and two fully connected layers or sub-networks. A region proposal network (RPN) is used to generate region proposals and the region of interest (ROI) pooling layer or network is used to detect objects from these proposals using selective search. Thus, in this example the neural network 404 extracts features that are fed to the feature mapping component 406. The feature mapping component passes the map data to the RPN, which generates region proposals, each proposal containing a potential object of interest. The region proposals, as well as the feature map data, are sent to the ROI pooling network 410, which attempts to search those proposals to identify objects in one or more of those regions. For any identified object, data for that region or object can be passed to the classifier, which will then analyze the region to determine whether the region corresponds to a logo 414 or a background 416 (or non-logo) region. Data for a determined logo region 414 can then be passed to the universal verifier. The classifier in some embodiments can be part of a neural network or machine learning algorithm, where the output once verified can be fed back into the machine learning algorithm for additional training. A universal logo detector can be trained end-to-end with the generated training set for detection. Some training data annotations yield hard negatives for the universal logo detector. The hard negative regions are the regions proposed by the detector and annotated to have no logos. The Faster-RCNN model in some embodiments can be altered to output three classes: logo, background, and hard negative to use this information during training. The hard negatives can reduce the average number of generated proposals, but may also reduce detector recall considerably.

Figure 5:
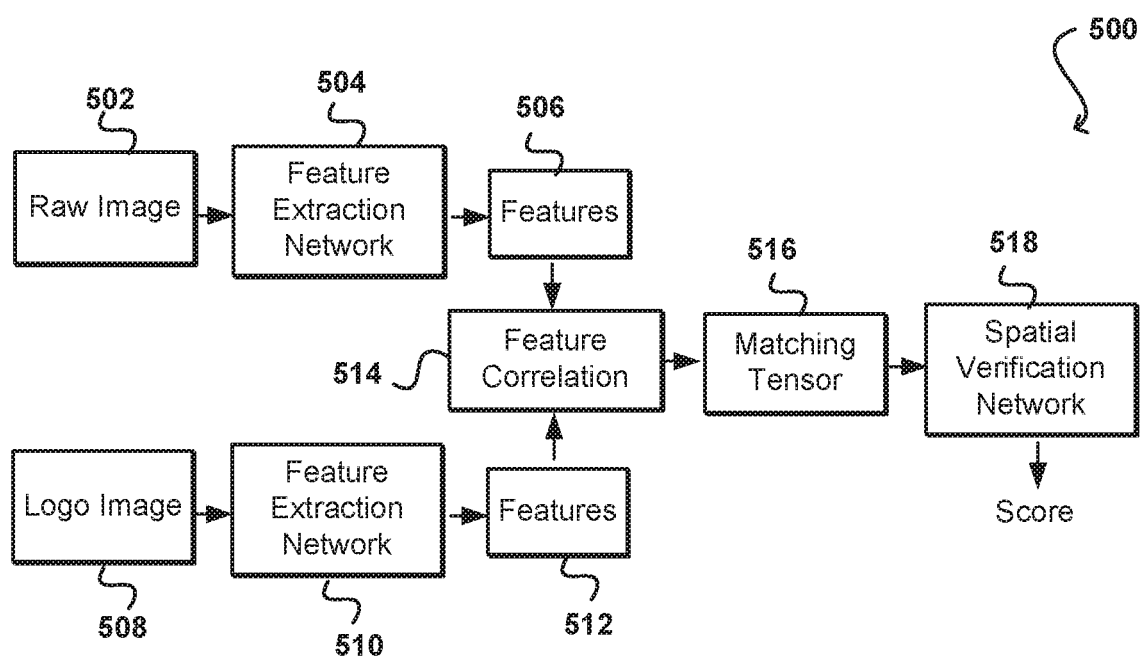
FIG. 5 illustrates an example pipeline useful for recognizing a representation of an object detected in image data that can be utilized in accordance with various embodiments.

FIG. 5 illustrates components of an example pipeline 500 that can be used for the universal verifier 322 of FIG. 3 in at least some embodiments. In this example, which will focus on a logo object type for explanation but can apply to any object type as discussed herein, the raw image data 502 for the logo region (from the universal detector) is provided to a first feature extraction network 504. A clean logo image 508, annotated or otherwise identified as including a representation of a specific logo, is directed to another feature extraction network 510. It should be understood that the processing of the clean logo image can be done offline or before the query image is received, and can use the same feature extraction as the raw image data in such circumstances. The feature extraction networks will extract the relevant features 506, 512, which are then fed to a feature correlation process 514 or component. The feature correlation will use a process such as those discussed elsewhere herein to attempt to correlate features from the different images that can be used to determine whether the images include representations of the same logo (or object, etc.). In this example, the feature correlation process 514 generates a matching tensor 516 that can be fed to a spatial verification network (SV-Net) 518. The SVN can generate a verification score that can be used to determine an image match, and ultimately the identity of the logo (or object) if the score meets or exceeds a specified score threshold. For example, a match might be determined if the verification score is at least 90 out of 100. In other embodiments the match with the highest score might be selected, or if there is no dominant high score then two or more matches with the highest scores may be selected as possibilities, among other such options. For search results, these scores might be used to identify search results to return, such as items having logos corresponding to the highest scores.

In one example for deep logo verification using such a pipeline, a language identification (LID-Net) architecture can be used as illustrated that consists of three major components: the feature extraction network (FE-Net), the feature correlation layer, and the spatial verification network (SV-Net). The FE-Net can extract feature maps from input images as discussed, where the feature maps can be viewed as densely and uniformly sampled local image features. The correlation layer 514 can compare all feature pairs between two feature maps and store the top results in the matching tensor 516. The matching tensor can then be passed into the SV-Net to predict the matching score between the two input images. To train the network end-to-end, two FE-Nets and one SV-Net can be arranged into a Siamese network structure. The weights of the two FE-Nets are not shared in this example due to the large domain differences between the logo-in-the-wild images and the canonical logo images.

As mentioned, conventional recognition approaches, such as those designed to recognize logos, are designed to recognize a fixed set of logo classes. Approaches in accordance with various embodiments discussed herein can instead provide for open set recognition, which enables the recognition of arbitrary objects, such as logos, products, or various other types of objects, without additional training of the relevant models or obtaining of additional training data. Open set approaches are also better suited, in many situations, for large scale logo recognition. An example open set recognition system can utilize a universal detector is able to analyze input image data, such as a received query image, to identify one or more candidate regions in the image data. Each candidate region can correspond to a type of object recognized by the process, such as a logo. A distance function, such as may be learned with a Siamese identification network, can then be utilized to determine the logo class. Such an approach provides significant performance enhancements relative to conventional recognition approaches. Various approaches can also utilize a specific type of dataset that includes orders of magnitude more classes than the largest existing public datasets.

As mentioned, such approaches can be used to recognize various types of objects, with logos and products being special cases or examples. Earlier logo recognition methods are based on traditional computer vision techniques for content based image retrieval. The recent success of convolutional neural networks (CNN) on object detection can be leveraged to formulate the logo recognition problem. These methods, such as Faster R-CNN, YOYO, and SSD, can perform localization and classification with a single CNN model for a pre-defined set of logos to build various logo recognition systems. These closed-set recognition methods strictly limit the recognition task to the set of training classes. If another logo class is to be supported, it is necessary to collect more data for the new class and re-train the whole model. Closed-set logo recognition methods require a large set of training images to achieve high accuracy. The challenges in data collection and annotation have limited the supported set of logo classes for these methods. There are at least half a million trademarks in the world and the Internet logo images have a long tail distribution. Therefore, it is impractical to collect and annotate a logo dataset to train a large scale closed-set logo recognition system.

In contrast, open-set logo recognition methods such as those described herein can support the recognition of arbitrary logos without additional training. One shot or few shot recognition are examples of open-set logo recognition methods. These methods only need the canonical logo images to recognize the logo appearances in natural images. As referred to herein, a canonical logo image consists of a clean logo image without any background or other objects represented in the image. There may be multiple variants for each logo class in at least some instances. An example open-set approach to recognizing arbitrary logos is called few shot logo recognition. Once such an approach is trained with a diverse logo dataset, it can recognize arbitrary logos outside its training set using one or a few canonical logo images. A universal logo detector can localize arbitrary logos in the wild, with an example detector being a Faster-RCNN model using ZF-Net with two output classes: logo and background. The localized logo regions can be passed to the identification stage that finds the matching canonical logo. The logo identification can utilize a DenseNet, or similar network or approach, to extract a feature map. A Siamese comparison network can then be used to generate the similarity score between the localized logo region feature maps and the canonical logo feature maps.

In one embodiment, a dataset was generated to be used for training the relevant networks. The example data set includes 100,000 images of products, mostly including representations of those products displayed against a white background. The images in the set may or may not contain any logos, but were annotated accordingly. In a first stage, annotators were asked to pick one of three labels for every image: "no logo present," "one logo present," or "multiple logos present." This was designed to simplify the task and to avoid collecting more than one bounding box per image. Each image was annotated by nine different annotators. A majority vote approach was used to quantify the consensus between the annotators. When the annotators could not reach a consensus for an image, the image was removed from the dataset. In a second step the annotators were asked to a draw a bounding box around a logo when an option other than "no logo" was selected. In case of "multiple logos," the annotators were asked to draw the bounding box around the largest, left-most logo for simplicity of annotating and training, although various other approaches could be used as well. The bounding boxes from all annotators were consolidated by picking the median coordinates of the overlapping annotations. Initially, manual re-annotation was performed for images which were labeled as "multiple logos present" by majority voting. In later stages, the universal logo detector was used to ease the re-annotation. There were images that reached "one logo present" consensus by a large margin with several non-overlapping bounding boxes. These images were re-annotated by the researchers In a third stage, the universal logo detector was used to generate region proposals, and annotators were asked whether a proposed region contained a logo. The annotators were also allowed to refine the proposed regions by providing a new bounding box. This process was performed on images that had high agreement in the previous two stages of annotation. This dataset and was used for training and testing the universal logo detector. At the final annotation stage, the annotators were asked to identify the logo class names in the bounding boxes and download the corresponding canonical logo images, if possible.

An example feature extraction network can use a CNN-based architecture without any fully-connected layers. Such a network can accept an input image and generate an output feature map, such as F∈Rh×w×c. This feature map, with height h and width w, can be interpreted as a map of local image features where F(i,j) is the feature vector of dimension c at location (i,j). A model such as a DenseNet-169 model can be used to extract the feature maps after the third transition layer, for example, and before the pool layer. The resulting dimensions of the feature map in this example are is 14×14×640. It should be noted that such an approach is agnostic to the choice of the feature extraction CNN. Networks such as VGG-16 may also be used, but may have a larger model size and yield lesser accuracy. The weights in some embodiments can be pre-trained on an ImageNet dataset for the image classification task, which can provide for sufficient initialization.

When performing feature correlation, two output feature maps, such as those from the FE-Nets, can be compared using a distance metric, such as D:($R^c$,$R^c$)→R. The cosine distance can be utilized in at least some embodiments. The distance comparisons of the two output feature maps can be organized into a matching tensor:

$$M(i,j,k)=D(F_{wild}(x,y),F_{logo}(i,j))$$

where (i,j) is the location at feature map $F_{logo}$, (x,y) is the location at feature map $F_{wild}$, and k=y×h+x is the enumerating index for every location in $F_{wild}$. The matching tensor can be passed through a channel-wise max pooling layer to keep top-most similar features for each Flogo(i,j), such as the top nine features, etc. In the feature correlation process, the matching tensor M(i,j,k) is computed by calculating the distance between canonical logo feature Flogo(i,j), and $k^{th}$ feature in logo-in-the-wild image $F_{wild}$(x,y). The matching tensor can be passed through two convolutional layers, followed by a fully-connected layer in the SV-Net to generate the final matching score prediction.

In some embodiments, the spatial verification network (SV-Net) accepts the matching tensor and predicts the similarity score. The network structure of the SV-Net is similar to the CNN in at least some embodiments. The SV-Net can be composed of two units, where both units contain a convolutional layer and a batch normalization layer, followed by a ReLU layer. A fully-connected layer is added after the units to predict the matching scores. Such a design exploits the structural locality of the natural images for matching score prediction. The convolutional layers have the equivalent function of finding local consensus. If the neighboring features are matching in certain patterns, these regions have a higher likelihood of producing a high matching score.

Various sampling strategies can be used on the training dataset. In one embodiment, the training dataset contains a vastly imbalanced dataset to train the LID-Net. There are a fixed number of positive samples—one canonical logo image for each positive logo region, while the negative samples are almost unlimited. A special sampling strategy can be used to train the network and avoid overfitting. During training, the universal logo detector proposals and the annotated regions can be used for generating training pairs. In some embodiments, regions having at least a minimum value, such as IoU>0.7, can be considered positive, and the regions with IoU<0.3 considered to be negative. To train the network effectively in one example approach, the following two negative pair sampling strategies can be employed. For a positive region proposal, a random incorrect canonical logo image is chosen as the negative pair. For a negative region proposal, a random canonical logo image can be chosen as the negative pair. In one example, the network was trained with the former sampling strategy. The weights of FE-Nets were fixed to their pre-trained values and the SV-Net was trained until convergence. Next, the network was trained on the equal mix of both sampling strategies. The weights of FE-Nets were trained with the learning rate multiplier of 0.1 to better adapt to the image domain differences. The network was trained until the first signs of overfitting, where the validation error starts increasing while the training error is still decreasing.

Taking such an approach, an example object dataset was collected and annotated a logo dataset for the detection and recognition tasks, respectively. A two stage open-set logo recognition method was then introduced for large scale logo recognition. The logo detection stage is trained to localize the universal class-agnostic concept of types of objects, such as logos. The identification is trained to calculate the matching score between the canonical images and the localized regions. One advantage of such an approach is that it can scale up to recognize more objects simply by adding canonical objects to its index. The results on a public dataset demonstrated that that such an approach handily outperforms the prior open-set baseline approach.

Figure 6:
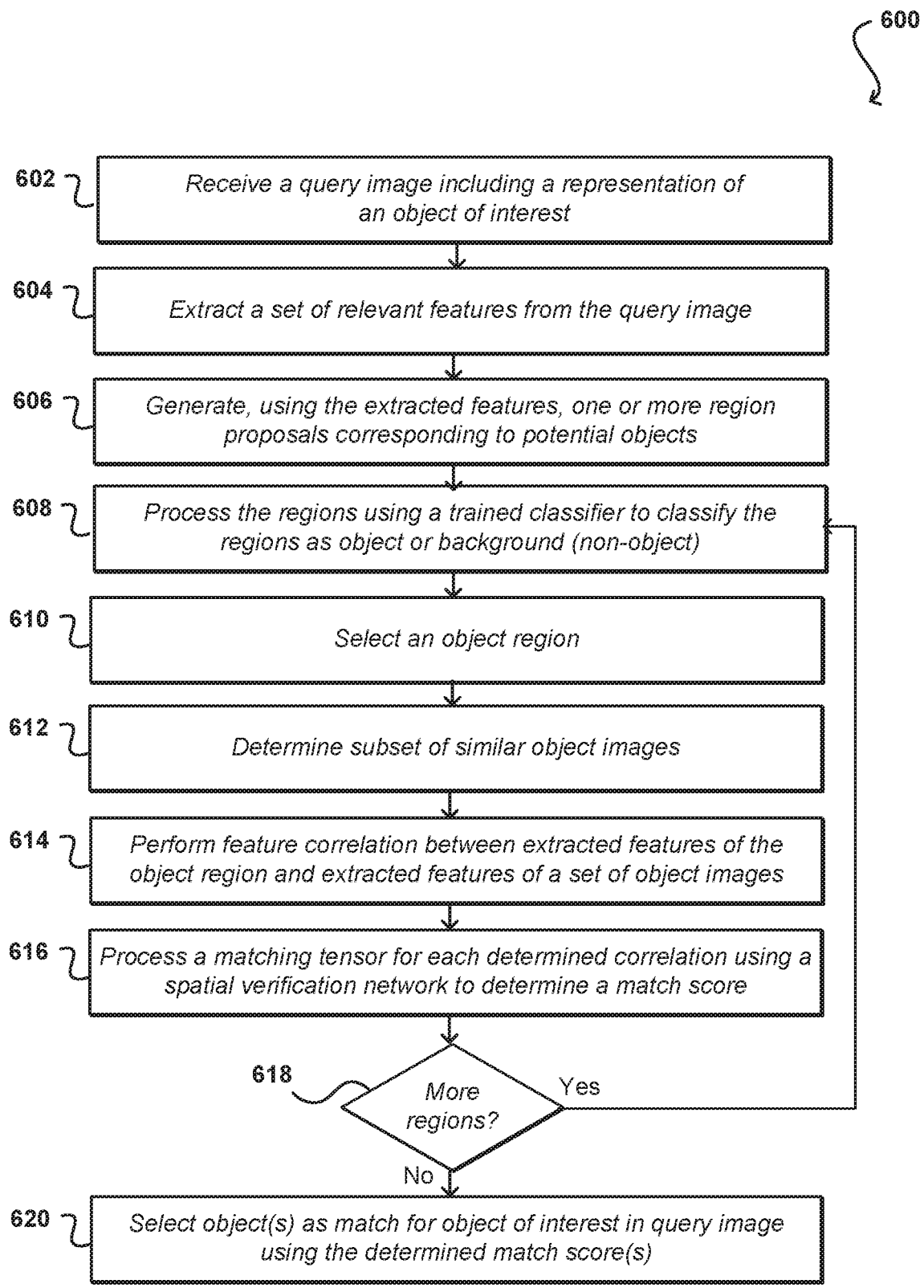
FIG. 6 illustrates an example process for determining content to provide in response to recognition of an object in specified image data that can be utilized in accordance with various embodiments.

FIG. 6 illustrates an example process 600 for recognizing objects in image data that can be utilized in accordance with one embodiment. It should be understood for this and other processes discussed herein that there can be additional, alternative, or fewer steps performed in similar or alternative orders, or in parallel, within the scope of the various embodiments unless otherwise stated. Further, although logos and apparel items are primary examples utilized herein, it should be understood that other types of objects or content can benefit from advantages of the various embodiments as well within the scope of the various embodiments. In this example, a query image is received 602 that include a representation of an object of interest. In at least some embodiments, a query image must have been submitted from a user for processing, or the user must have provided permission or opted into a program wherein such images are available for such analysis. While any query image may be processed, for purposes of explanation it will be assumed that the image was captured or acquired because it included a representation of such an object, for which a user wants to obtain at least some type of related information or content. As mentioned, the image data can be processed using a universal detector and a universal verifier in some embodiments, although a single component or set of components can be used to perform the same, or similar, steps within the scope of the various embodiments. In this example, a set of relevant features is extracted 604 from the query image, such as by using a trained feature extraction network. These may be any relevant image features known or used for such purposes, as might be determined using a relevant feature identification process or algorithm, etc. Using the extracted features, one or more region proposals can be generated 606 that correspond to potential objects represented in the image. The generation of the proposals can use any object detection process or algorithm discussed or suggested herein, or that would be apparent to one of ordinary skill in the art in light of the present disclosure. The determined regions can then be processed 608 using a trained classifier to classify the regions as object regions or background/non-object regions. Once at least one object region is identified, the object region can be selected 610 for verification. In order to reduce the search space, or otherwise reduce the amount of processing that would otherwise be needed to analyze a large set of images, a subset of similar object images can be determined 612 that are related in some way to the content of the object region to be verified. This can include, for example, performing a k-nearest neighbor search, or other such proximity or similarity search or analysis, to attempt to identify a potentially relevant subset of images to be analyzed as discussed in more detail elsewhere herein. Feature correlation can be performed 614 between extracted features of the object region and extracted features of each of a set of object images. As mentioned, the object images can be "clean" object images that show only a specific type of object against a solid background, for ease of comparison. The images will also be annotated or otherwise associated with descriptive information identifying the object represented in a specific image. The features used for an object region can be those used previously, or can be a new set of features extracted from the specific object region, using the same or a different feature extraction method. From the correlation of at least some of the images a matching tensor will be generated. The matching tensor can then be processed 616 using a spatial verification network to determine a match score between the query image and a respective object image. If it is determined 618 that there are more object regions for the query image then the process can continue. Otherwise one or more objects can be selected 620 as matches for one or more objects represented in the image using the determined match scores, such as for a highest match score or any score at least satisfying a minimum selection threshold or criterion. Information for the identified object(s) can then be returned or made available as part of a response generated in response to the query image. Such an approach can provide large scale instance recognition for objects.

Figure 7:
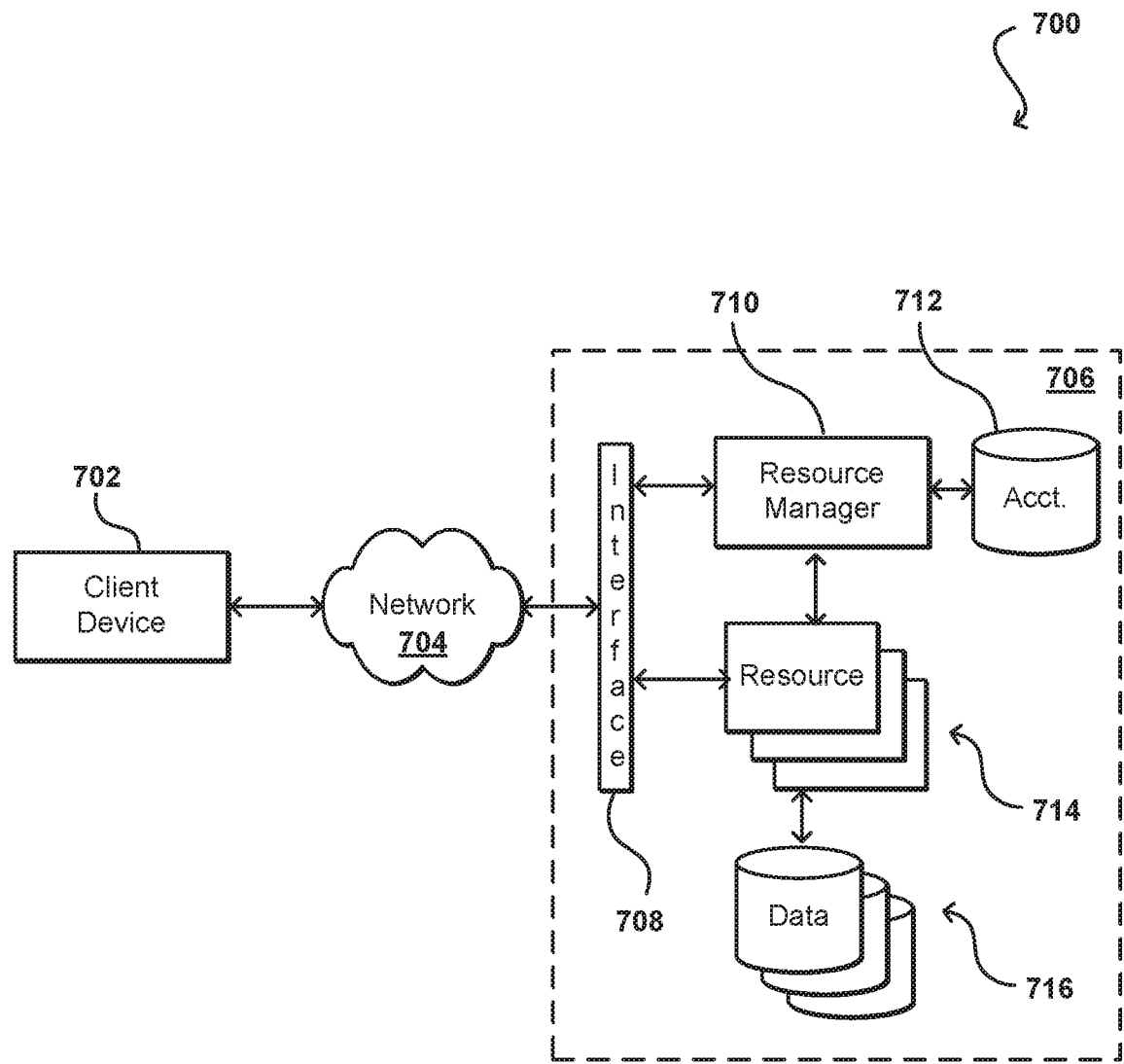
FIG. 7 illustrates an example environment in which various embodiments can be implemented.

FIG. 7 illustrates an example environment 700 in which aspects of the various embodiments can be implemented. In this example a user is able to utilize a client device 702 to submit requests across at least one network 704 to a multi-tenant resource provider environment 706. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 704 can include any appropriate network, including an intranet, the Internet, a cellular network, a local area network (LAN), or any other such network or combination, and communication over the network can be enabled via wired and/or wireless connections. The resource provider environment 706 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 714 of one or more types. These types can include, for example, application servers operable to process instructions provided by a user or database servers operable to process data stored in one or more data stores 716 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 714 can submit a request that is received to an interface layer 708 of the provider environment 706. The interface layer can include application programming interfaces (APIs) or other exposed interfaces enabling a user to submit requests to the provider environment. The interface layer 708 in this example can also include other components as well, such as at least one Web server, routing components, load balancers, and the like. When a request to provision a resource is received to the interface layer 708, information for the request can be directed to a resource manager 710 or other such system, service, or component configured to manage user accounts and information, resource provisioning and usage, and other such aspects. A resource manager 710 receiving the request can perform tasks such as to authenticate an identity of the user submitting the request, as well as to determine whether that user has an existing account with the resource provider, where the account data may be stored in at least one data store 712 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 702 to communicate with an allocated resource without having to communicate with the resource manager 710, at least until such time as a relevant aspect of the user account changes, the user is no longer granted access to the resource, or another such aspect changes.

The resource manager 710 (or another such system or service) in this example can also function as a virtual layer of hardware and software components that handles control functions in addition to management actions, as may include provisioning, scaling, replication, etc. The resource manager can utilize dedicated APIs in the interface layer 708, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 708 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 8:
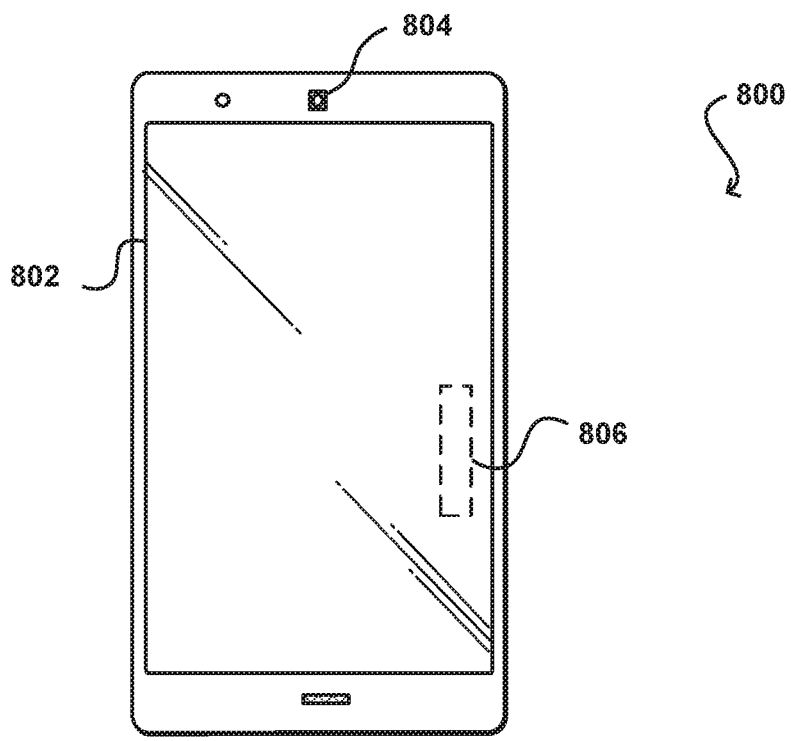
FIG. 8 illustrates an example computing device that can be utilized to capture and provide image data in accordance with various embodiments.

FIG. 8 illustrates an example computing device 800 that can be used to perform methods in accordance with various embodiments discussed and suggested herein. In this example, the device has at least one camera or sensor 804 positioned at one or more locations for capturing image data. The device also includes a display element 802 that can be used to provide a live view of image data captured by the camera, in order to assist with image capture. In this example, the camera and/or sensor are each capable of capturing image information over at least a visible spectrum, and in at least some embodiments can select between operational modes. It should be understood, however, that there can be fewer or additional elements of similar or alternative types in other embodiments, and that there can be combinations of cameras, infrared detectors, gesture sensors, and other such elements used with various devices. A communications element 806 can be included that enables the device to, wired or wirelessly, communicate information such as captured image data across at least one network Various other elements and combinations of elements can be used as well within the scope of the various embodiments as should be apparent in light of the teachings and suggestions contained herein.

Figure 9:
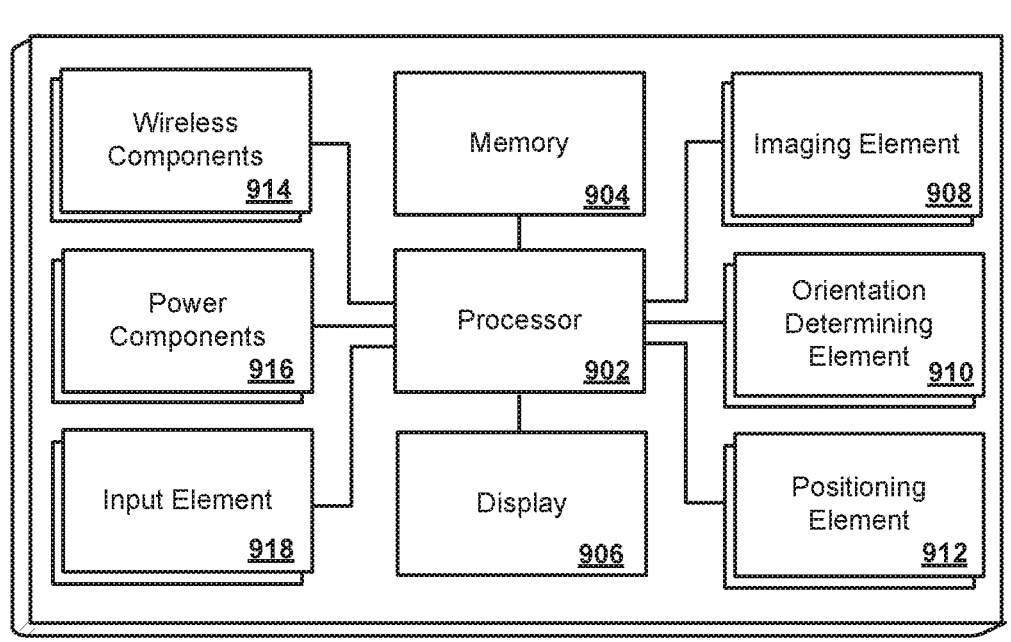
FIG. 9 illustrates example components of a computing device that can be used to implement aspects of the various embodiments.

FIG. 9 illustrates a set of basic components of an electronic computing device 900 that can be utilized to implement aspects of the various embodiments. In this example, the device includes at least one processing unit 902 for executing instructions that can be stored in a memory device or element 904. As would be apparent to one of ordinary skill in the art, the device can include many types of memory, data storage, or computer-readable media, such as a first data storage for program instructions for execution by the processing unit(s) 902, the same or separate storage can be used for images or data, a removable memory can be available for sharing information with other devices, and any number of communication approaches can be available for sharing with other devices. The device typically will include some type of display screen 906, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 908, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 900 also includes at least one orientation determining element 910 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 900. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 912 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 914 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 916, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 918 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   obtaining image data;
   determining, from the image data, a set of proposed object regions;
   analyzing, using a trained classifier, the proposed object regions to determine a subset of proposed object regions having a highest likelihood of including representations of at least one object, the proposed object regions being pooled using a region-of-interest pooling network;
   determining, from a set of object images, a subset of object images having a similarity to the proposed object regions;
   performing spatial validation using correlated features of the subset of proposed object regions and each of the subset of object images to generate a set of similarity scores; and
   providing information for a matching object based at least in part upon a respective similarity score between a respective proposed object region and a respective object image.

2. The computer-implemented method of claim 1, further comprising:
   generating, through feature correlation of the object region and each of the subset of object images, a set of matching tensors; and
   processing the matching tensors in the spatial validation.

3. The computer-implemented method of claim 1, wherein the proposed regions are pooled before classifying using the trained classifier.

4. The computer-implemented method of claim 3, further comprising:
   generating proposals for the subset of proposed object regions using a region proposal network (RPN), wherein the region-of-interest pooling network is configured to identify a proposed region as an object region using selective search on the proposals.

5. The computer-implemented method of claim 1, further comprising:
   receiving, from a client device, a search request; and
   obtaining the image data from the search request.

6. The computer-implemented method of claim 5, further comprising:
   providing the information for the matching object as at least one search result in response to the search request.

7. The computer-implemented method of claim 1, further comprising:
   determining, from the image data, pixel coordinates defining bounding boxes for the subset of proposed object regions; and
   providing the pixel coordinates for purposes of analyzing the proposed object regions using the trained classifier.

8. The computer-implemented method of claim 1, further comprising:
   providing a training data set including a maximum ratio of object images relative to images without represented objects, a number of object images in the training data being lower than a number of images without represented objects.

9. The computer-implemented method of claim 1, further comprising:
   performing feature extraction on the image data using a trained convolutional neural network.

10. The computer-implemented method of claim 1, wherein the spatial validation is configured to identify objects of arbitrary types.

11. A system, comprising:
    at least one processor; and
    memory including instructions that, when executed by the at least one processor, cause the system to:
    obtain image data;
    determine, from the image data, a set of proposed object regions;
    analyze, using a trained classifier, the proposed object regions to determine a subset of proposed object regions having a highest likelihood of including representations of at least one object;
    identify, in the image data, the subset of proposed object regions;
    pool the subset of regions using a region-of-interest pooling network;
    determine, from a set of object images and using a proximity search, a subset of object images having a similarity to the proposed object region;
    perform spatial validation using correlated features of the subset of proposed object regions and each of the subset of object images to generate a set of similarity scores; and provide information for a matching object based at least in part upon a respective similarity score between a respective proposed object region and a respective object image.

12. The system of claim 11, wherein the instructions when executed further cause the system to:
generate, through feature correlation of the object region and each of the subset of object images, a set of matching tensors; and
process the matching tensors in the spatial validation.

13. The system of claim 11, wherein the proposed regions are pooled using a region-of-interest pooling network before classifying using the trained classifier.

14. The system of claim 13, wherein the instructions when executed further cause the system to:
generate proposals for the subset of proposed object regions using a region proposal network (RPN), wherein the region-of-interest pooling network is configured to identify a proposed region as an object region using selective search on the proposals.

15. The system of claim 11, wherein the instructions when executed further cause the system to:
receive, from a client device, a search request;
obtain the image data from the search request; and
provide the information for the matching object as at least one search result in response to the search request.

16. A non-transitory computer-readable storage medium storing instructions, the instructions when executed by a processor causing the processor to:
obtain image data;
determine, from the image data, a set of proposed object regions;
analyze, using a trained classifier, the proposed object regions to determine a subset of proposed object regions having a highest likelihood of including representations of at least one object;
identify, in the image data, the subset of proposed object regions;
pool the subset of regions using a region-of-interest pooling network;
determine, from a set of object images and using a proximity search, a subset of object images having a similarity to the proposed object region;
perform spatial validation using correlated features of the subset of proposed object regions and each of the subset of object images to generate a set of similarity scores; and
provide information for a matching object based at least in part upon a respective similarity score between a respective proposed object region and a respective object image.

17. The non-transitory computer-readable storage medium of claim 16, wherein the instructions when executed further cause the processor to:
generate, through feature correlation of the object region and each of the subset of object images, a set of matching tensors; and
process the matching tensors in the spatial validation.

18. The non-transitory computer-readable storage medium of claim 16, wherein the proposed regions are pooled using a region-of-interest pooling network before classifying using the trained classifier.

19. The non-transitory computer-readable storage medium of claim 18, wherein the instructions when executed further cause the processor to:
generate proposals for the subset of proposed object regions using a region proposal network (RPN), wherein the region-of-interest pooling network is configured to identify a proposed region as an object region using selective search on the proposals.

20. The non-transitory computer-readable storage medium of claim 16, wherein the instructions when executed further cause the processor to:
receive, from a client device, a search request;
obtain the image data from the search request; and
provide the information for the matching object as at least one search result in response to the search request.

* * * * *